(12) United States Patent
Paul et al.

(10) Patent No.: US 10,224,774 B2
(45) Date of Patent: Mar. 5, 2019

(54) ROTOR SHAFT WITH A LAMINATED CORE

(71) Applicant: ThyssenKrupp Presta TecCenter AG, Eschen (LI)

(72) Inventors: Daniel Paul, Burkhardtsdorf (DE); Juergen Meusel, Dittmannsdorf (DE); Kay Hameyer, Heverlee (BE); Thomas Herold, Aachen (DE); Teofil Cristian Andrej, Aachen (DE)

(73) Assignee: THUSSENKRUPP PRESTA TECCENTER AG, Eschen (LI)

( * ) Notice: Subject to any disclaimer, the term of this patent is extended or adjusted under 35 U.S.C. 154(b) by 291 days.

(21) Appl. No.: 15/309,114

(22) PCT Filed: Apr. 22, 2015

(86) PCT No.: PCT/EP2015/058682
§ 371 (c)(1),
(2) Date: Nov. 4, 2016

(87) PCT Pub. No.: WO2015/172986
PCT Pub. Date: Nov. 19, 2015

(65) Prior Publication Data
US 2017/0117766 A1 Apr. 27, 2017

(30) Foreign Application Priority Data
May 12, 2014 (DE) .................. 10 2014 106 614

(51) Int. Cl.
H02K 1/12 (2006.01)
H02K 1/28 (2006.01)
(Continued)

(52) U.S. Cl.
CPC ............. H02K 1/28 (2013.01); H02K 1/22 (2013.01); H02K 15/02 (2013.01)

(58) Field of Classification Search
CPC ............. H02K 1/22; H02K 15/02; H02K 1/28
(Continued)

(56) References Cited

U.S. PATENT DOCUMENTS 3,204,134 A * 8/1965 Schneider ................ H02K 1/28
310/216.121
4,377,762 A 3/1983 Tatsumi et al.
(Continued)

FOREIGN PATENT DOCUMENTS

DE 1950586 A1 9/1970
DE 2415582 A1 10/1975
(Continued)

OTHER PUBLICATIONS

Int'l Search Report for PCT/EP2015/058682 dated Jul. 23, 2015 (dated Jul. 30, 2015).
(Continued)

*Primary Examiner* — Naishadh Desai
(74) *Attorney, Agent, or Firm* — thyssenkrupp North America, Inc.

(57) ABSTRACT

A method for mounting laminated sheets onto a shaft of a rotor provided for an electrical machine may involve sliding the laminated sheets onto the shaft and bracing the laminated sheets between two rotation-resistant thrust washers connected with the shaft. The laminated sheets may be slid onto the shaft to lie against a stop in the form of a first thrust washer arranged upon a first subsection of the shaft. A second thrust washer may be pressed in by axially bracing the laminated sheets onto a second axial subsection of the shaft in a frictional interlocking manner. The second thrust washer may be positioned after a surface of the second subsection has been enlarged by the introduction of an exterior surface profile.

13 Claims, 4 Drawing Sheets

(51) Int. Cl.
*H02K 1/22* (2006.01)
*H02K 15/02* (2006.01)

(58) Field of Classification Search
USPC .................................................. 310/112–114
See application file for complete search history.

(56) References Cited

U.S. PATENT DOCUMENTS

| | | | | |
|---|---|---|---|---|
| 4,597,365 | A | * | 7/1986 | Madaffer ................ F01L 1/047 |
| | | | | 123/90.6 |
| 4,781,076 | A | * | 11/1988 | Hartnett ............... B21D 53/845 |
| | | | | 29/432 |
| 2007/0096589 | A1 | | 5/2007 | York |
| 2012/0279467 | A1 | | 11/2012 | Scherzinger et al. |

FOREIGN PATENT DOCUMENTS

| | | |
|---|---|---|
| DE | 4121951 C1 | 12/1992 |
| DE | 10 2006 036 392 A1 | 11/2007 |
| DE | 10 2008 004 876 A1 | 8/2008 |
| DE | 10 2007 039 186 A1 | 2/2009 |
| DE | 102009057633 B3 | 3/2011 |
| DE | 10 2010 031 399 A1 | 1/2012 |
| DE | 10 2011 012 429 A1 | 8/2012 |
| EP | 1530278 A2 | 5/2005 |
| JP | S5752335 A | 3/1982 |
| JP | 2005184957 A | 7/2005 |
| WO | 2009024485 A3 | 2/2009 |

OTHER PUBLICATIONS

Wikipedia: Randeln. Version vom Mar. 12, 2013, http://de.wikipedia.org/w/index.php?title=Randeln&direction=next&oldid=117116042 (more recent version attached for reference only).
English Abstract of DE2415582A1.
English Abstract of DE10 2007 039 186 A1.
English Abstract of DE10 2010 031 399 A1.
English Abstract of DE 10 2008 004 876 A1.
English Abstract of DE 10 2006 036 392 A1.
English Abstract of DE 10 2011 012 429 A1.
English Abstract of JP2005184957A.
English Abstract of WO2009024485A3.
English Abstract of DE1950586A1.
English Abstract of DE4121951C1.

* cited by examiner

ROTOR SHAFT WITH A LAMINATED CORE

CROSS REFERENCE TO RELATED APPLICATIONS

This application is a U.S. National Stage Entry of International Patent Application Ser. Number PCT/EP2015/058682, filed Apr. 22, 2015, which claims priority to German Patent Application No. DE 10 2014 106 614.6 filed May 12, 2014, the entire contents of both of which are incorporated herein by reference.

FIELD

The present disclosure relates to rotors for electrical machines and methods for mounting laminated sheets onto shafts of rotors of electrical machines.

BACKGROUND

A number of such rotors with laminated sheets arranged thereupon are known in the prior art, most of which regard sheets which, more or less extensively, are punched stacks. These rotors are used in asynchronous machines and in permanent magnet synchronous machines. Regarding rotors known in the prior art, additional elements are often used in producing a reliable connection for transmitting torque between the lamination stacks and the shaft, such as axial tie rods, positive locking means, or other helpful means, such as glue.

There are also joining techniques known, in which the lamination stack is held onto the shaft via an interference fit. Thermally shrinking the lamination stacks is also known, whereby the shaft is cooled and the lamination stack accordingly heated. This thermal joining, however, is cumbersome and involves a great expenditure of energy and time. In addition, problems occur with condensation, which can build up due to temperature differences in the joining region. Furthermore, joining methods are known, in which lamination stacks are simply mechanically pressed onto the shaft. The application of pressure, however, requires that the lamination stacks be highly stable, which is not so with lamination stacks that are merely punched. Instead, regarding this sort of mechanically joined interference fit, lamination stacks are used which have been laminated with baked enamel, thus forming a stable structure. For stacks of this kind, the mechanical joining is further augmented by the adhesive properties of the baked enamel.

Furthermore, for example, a rotor is known from DE 10 2007 039 186, in which the lamination stack is slid onto the support element and arranged between the facing compression rings, whereby the compression rings are braced against one another by a bolted tie-rod and shrunk onto the shaft, or are attached to the shaft using some other type of rotation-resistant shaft-hub connection. In this case, a high degree of production cost and effort is needed in order to correctly establish the connection of the compression rings with the shaft on the one hand, and, on the other hand, their tension against one another.

Rotors of elaborate design are disclosed in DE 1950 586, in which the lamination stack is braced tightly between two nuts screwed onto the shaft. As a result of the tension of the lamination stack with respect to the shaft, a high degree of bending stiffness is achieved for the rotor. In order to compensate for the thermal expansion of the lamination stack, additional elastic elements are described, which are arranged between the lamination stack and the nuts. A similarly conceived rotor is known from JP 2005184957, whereby, in this case, axial grooves in the shaft are provided, in which the lamination stack is seated via corresponding protrusions.

Frictional press-fit connections for lamination stacks are also known, for example from DE 10 2011 012 429, in that case to a hollow shaft. These have the disadvantage that the electromagnetic effect of the sheets is impaired at the joining diameter. In addition, stresses on the connections joined on the inside diameter of the lamination stack via interference fit act to impair material properties and consequently the function of the electromagnetic sheet.

Regarding the design of rotors for synchronous machines, it should be generally noted that permanent magnets, which consist of brittle material, are embedded into the lamination stack and can sustain damage due to stresses from the interference fit.

DETAILED DESCRIPTION

Figure 1:
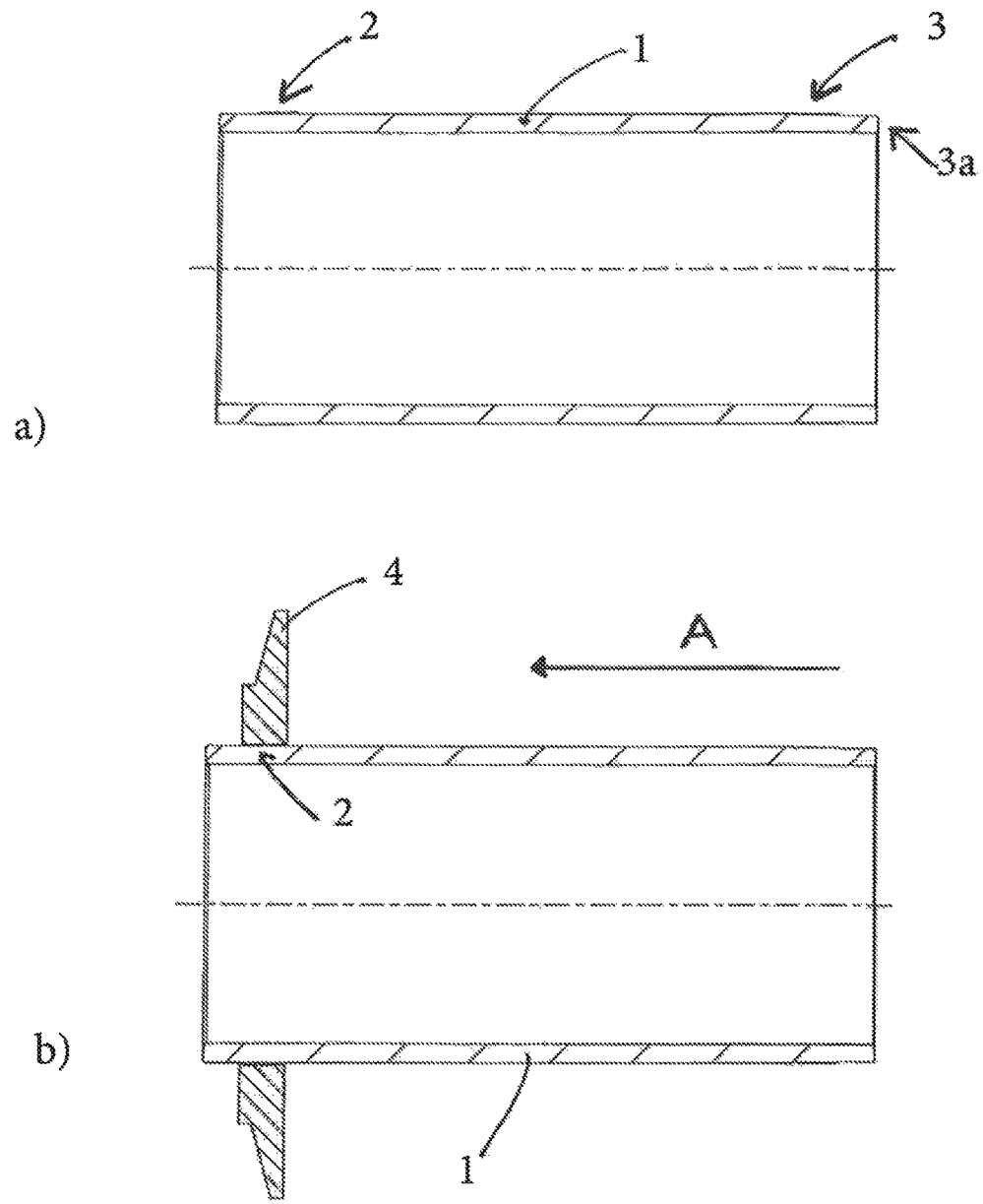
FIG. 1a-1d are cross-sectional views illustrating four example phases of production.
Figure 1:
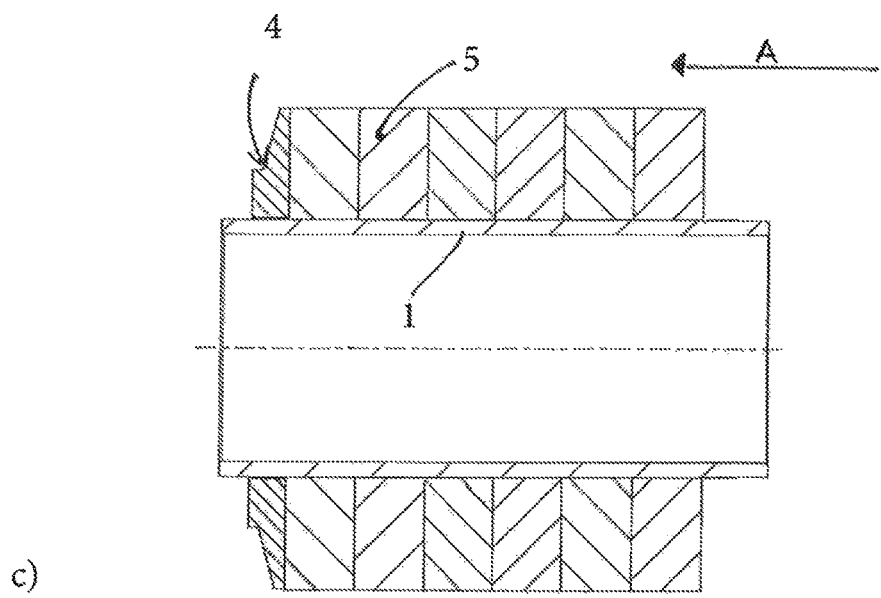
Figure 1:
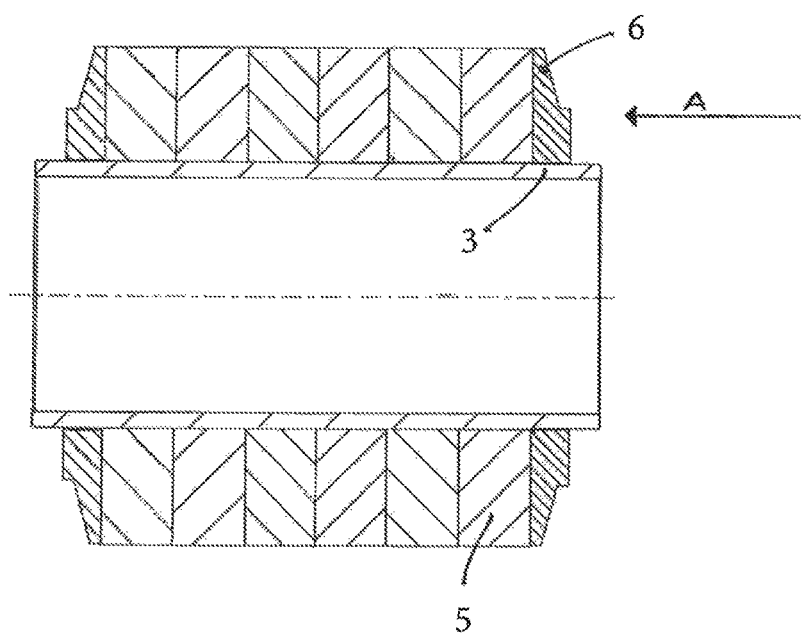

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element.

The present disclosure generally concerns methods for mounting laminated sheets onto shafts of rotors for electrical machines. In some examples, laminated sheets are smoothly slid onto a shaft and braced between two thrust washers connected with the shaft in a rotation-resistant manner. The present disclosure also generally concerns a rotor with such a shaft and an electrical machine with said shaft and, in particular, an induction motor or a permanent magnet synchronous machine.

An object of the present invention is to now create a method for mounting sheets onto the shaft of a rotor which can be implemented with simple technical means and enables the economical and damage-free manufacture of rotors. An additional object of the invention is to create a rotor that is stable and economical to manufacture yet light weight, can be subjected to heavy loads and, above all, can transmit high torques.

In accordance with the claims, the essential aspect of the invention is the lamination stack placed with clearance on the shaft of the rotor solely being held via the axial, frictional pressure between two thrust washers mounted on the shaft, whereby at least the one pressure-applying second thrust washer is itself joined with the shaft by means of a frictional interlocking connection to a sub-section of the shaft enlarged by machining. The other first thrust washer may consist of a fixed stop situated on the shaft, for example in the form of a recess shaped from the shaft.

According to the invention, the individual sheets respective the sheets punched to the more or less extensively punched lamination stacks are initially slid onto the shaft without force and with radial plan, then centered in place against a stop. The lamination stack in place is then, with the use of the thrust washer likewise slid onto the shaft, braced in an axial direction such that it—apart from possibly being centered by the partially interlocking action of a centering aid—is precisely and permanently fixed between the stop and the thrust washer purely via a frictional connection. The mounting of the thrust washer bracing the stack in an axial direction takes place according to the invention by said thrust washer pressing in a frictional, interlocking manner on the enlarged sub-section of the shaft specifically manufactured from steel. With said bracing, sufficiently large bracing and holding forces can be applied to the lamination stack.

The widening of one or more sub-sections of the shaft takes place advantageously through knurling by way of rolling and/or turning, by which the material on the shaft surface is displaced so that material enlargements or other structures result which run axial or tangential to the surface. In one preferred embodiment, a threading is rolled at zero pitch into the surface of the shaft (roller burnishing), consequently rolling a progression of bulges covering the circumference, onto which the thrust washers are compressed with a minimal internal toothing provided in the central bore. Methods for enlarging the circumference are known, for example, from DE 41 21 951 or DE 10 2009 057 633, whereby the method described in these documents is used for pressing trip dogs onto camshafts. The method is also known to those skilled in the art as the Presta® process.

According to the invention, the sheets, in particular the lamination stacks punched and pre-fabricated to shape, are slid onto the shaft to then lie flat against a stop already mounted onto a first sub-section of the shaft, whereby the stop is advantageously in the form of a first annular thrust washer. After fitting the sheets, which relates to sliding on the lamination stack, the second thrust washer is pressed in by axially bracing the somewhat compressible lamination stack with a specified frictional interlocking force onto the second axial sub-section of the shaft, which takes place subsequent to the surface of the second axial sub-section, upon which the second thrust washer rests, having earlier been enlarged by the introduction of the exterior surface profile.

Since the method according to the invention can be managed with a small number of components and assembly steps, rotors for electrical machines can be produced in large numbers in a particularly simple and economical manner. In the process, due to accomplishing compression at high, specified forces sufficient for generating the respective frictional connection between the lamination stack and the thrust washers pressed tight on the shaft, a large amount of torque can be transmitted from the stator to the rotor shaft via the lamination stack braced between the thrust washers. Moreover, the pressure forces can be so focused and cause such little damage that there is no fear of changing the geometry of the rotor or degrading the magnets embedded within the lamination stack. Also, the bracing of the lamination stack between the pressure thrust washers causes a tension on the shaft, thus increasing the stiffness of the entire rotor.

In the method according to the invention, the elastic force of the compressed lamination stacks is, in any case, utilized as an existing attachment property. In addition, the compression results in improved electromagnetic characteristics, since no "wasted" layers of air remain between the sheets.

It is furthermore advantageous that the entire method can be carried out at room temperature, and that generating the press fits does not rely on considerable differences in temperature. In the process, the method may be used for the production of any rotors having shafts fitted with laminated sheets. It does not matter whether the shafts are hollow or solid. It must merely be possible that the surface of the shafts upon which both of the thrust washers are supported can be enlarged to the necessary degree using the method described.

According to the invention, it does not initially matter how the first thrust washer forming the stop is made and mounted onto the shaft. A washer mold is not absolutely necessary as long as the shape and the attachment are fulfilling the function of a stop. However, in an embodiment particularly advantageous because it is simple to manufacture, the first thrust washer is also pressed onto the corresponding first axial sub-section of the shaft in a frictional interlocking manner. In this respect, the mounting of the first thrust washer is comparable to the mounting of the second thrust washer. Thus, in a first method step for compressing the first thrust washer congruent to the surface of the first axial sub-section of the shaft, said first axial sub-section and thus its radius is enlarged through the introduction of an exterior surface profile.

Advantageously, the method makes use of the following sequence of steps:

First, the exterior surface profiles of both shaft sub-sections are enlarged. In doing so, it does not matter whether it is a hollow shaft or a solid shaft. The hollow shaft can be advantageous when end flanges are pressed into the openings facing the ends, the hollow shaft providing proper stability for rolling the outward lying sub-sections. The first thrust washer that forms the stop is pressed onto the first rolled sub-section of the shaft pre-assembled as above. In the process, the shaft can lie with the face of the flange resting on a mounting plate so that the shaft is facing vertically upward. The thrust washer is then fitted and set upon the rolling prior a mounting tool pressing the thrust washer under high pressure onto the sub-section. The first thrust washer is now mounted.

Subsequently, the sheets are fitted onto the shaft and across the second rolled sub-section without force to lie against the first thrust washer. The second thrust washer is then fitted and set upon the rolling of the second sub-section. Using the subsequently fitted mounting tool, the second thrust washer is pressed with high pressure onto the second sub-section, thus lying at the end face of the lamination stack. The application of pressure is continued without interruption so that the lamination stack is compressed by a specific mounting force. Pressing the second thrust washer onto the shaft therefore occurs by bracing the sheets.

In cases where the sheet stack itself does not possess sufficient axial compressibility in order to develop the elastic forces necessary for building the frictional connection, it is advantageous to provide an additional elastic element that is also fitted onto the shaft and then braced together with the sheets between the two thrust washers. The elastic element can consist of a disc spring made of steel or a compressible buffer element. The use of the buffer element has the further advantage of helping to compensate for a temperature-related expansion of the lamination stack, and has the elastic force necessary to maintain a frictional connection in all conditions.

The method will exhibit a large "tolerance" with respect to the usual axial tolerances of lamination stacks if the second thrust washer is fitted with force control and not displacement control, and the rolling is carried out in an "extra wide" manner.

In FIG. 1 the four initial method steps a) to d) for the mounting of laminated sheets onto a hollow shaft 1 of a rotor provided for an electrical machine are shown. Initially, in the first step according to FIG. 1a, the surface of the hollow shaft 1 at a first sub-section 2 and a second sub-section 3 is enlarged by the rolling of an exterior surface profile, in this case a threading with zero pitch.

The enlargements may be ground to final dimensions following their production. In the subsequent step 1b, a thrust washer 4 forming the stop is slid onto the thus pre-assembled hollow shaft 1 in the direction of the arrow A to lie upon the rolling, then pressed with a mounting tool onto the first rolled sub-section 2. In doing so, the wall of the bore in the thrust washer 4 can likewise be roughened by a threading having a lesser depth than the exterior surface profile in sub-section 2. The thrust washer 4 reamed in this manner sits on the hollow shaft 1 in a frictional interlocking press fit.

In step 1c, the sheets in the previously punched laminated stacks 5 are fitted onto the hollow shaft 1 and across the rolled second sub-section 3 without force in the direction of the arrow A until they lie against the first thrust washer 4, which forms a stop. In order for the fitting of the laminated stack 5 across the sub-section 3 to succeed, the receiving opening in the laminated stack 5 in the form of a central bore is of larger diameter than that of the second sub-section 3, so that a small gap remains in the second sub-section 3 between the hollow shaft 1 and the laminated stack 5.

Then, in step 1d, the second thrust washer 6 is initially set upon the hollow shaft 1 and pressed at high pressure with a mounting tool (not shown) onto the second sub-section 3 in the direction of the arrow A, said thrust washer 6 thereby lying against the face of the laminated stack 5 and subject to the exertion of an axial bracing force. The pressure in the direction of the arrow is continued, and compresses the lamination stack with a specific mounting force. As a consequence of the compression of the second thrust washer 6, the laminated stack 5 are braced axially. Thus, the laminated stack 5 are smoothly slid onto the hollow shaft 1 and braced between the two rotation-resistant thrust washers 4 and 6 connected with the hollow shaft 1. The torque from the laminated stack 5 is transmitted onto the hollow shaft 1 via the thrust washers 4 and 6.

In order to enable mounting from one direction (arrow A), the hollow shaft 1 at the first sub-section 2—as already mentioned—has a slightly larger outer diameter than at the second sub-section 3, whereby the smaller diameter extends as far as the corresponding end 3a of the hollow shaft 1. The outer diameter of the second sub-section 3 is smaller than the diameter of the central bore of the first thrust washer 4, so that said thrust washer 4 can easily be fitted across the second sub-section 3. The central bore of the second thrust washer 6 matches the enlarged, smaller diameter of the second sub-section 3 and can be pressed onto it.

Figure 2:
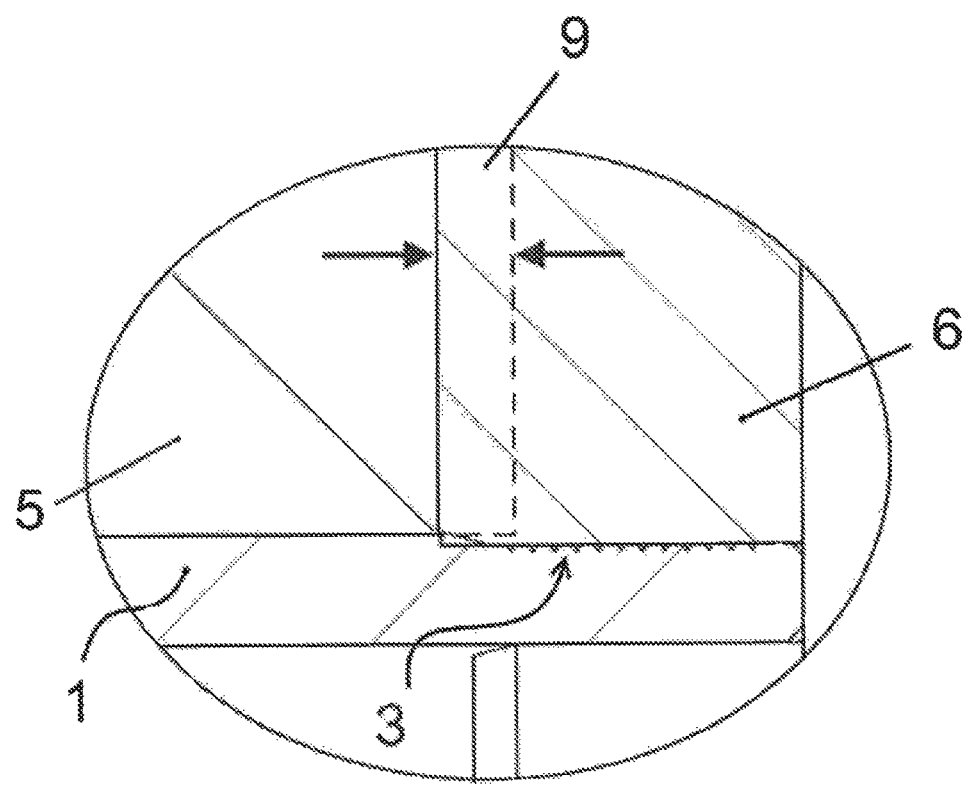
FIG. 2 is a sectional view of an example hollow shaft with a lamination stack pressed thereon.

FIG. 2 shows a sectional view of the second sub-section 3 with the second thrust washer 6 pressed onto the hollow shaft 1. There is a tolerance between the length of the laminated stack 5 and the thrust washer 6, therefore an area shown as 9, within which the stack of laminated sheets may be compressed by the pressing of the thrust washer 6. In this area, the laminated stack 5 may project beyond the enlarged diameter of the second section.

Figure 3:
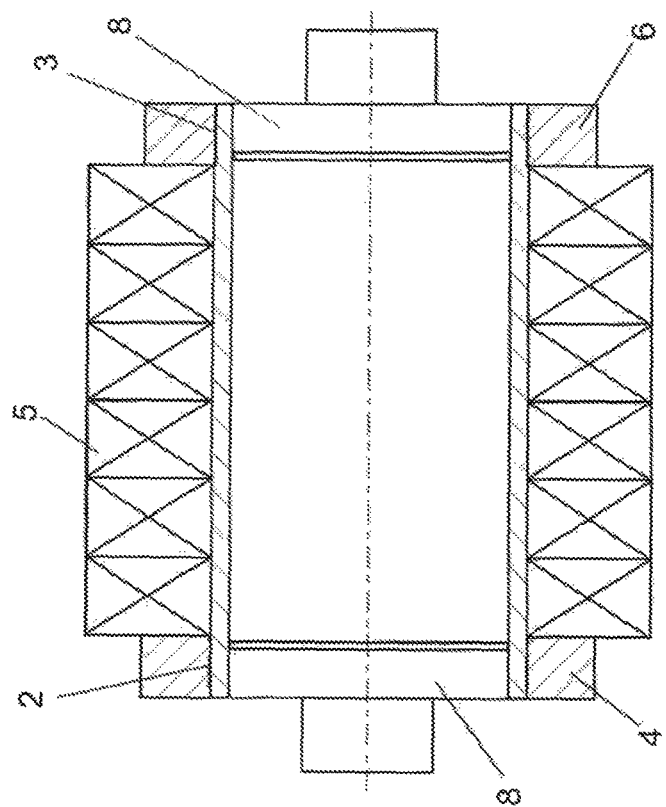
FIG. 3 is a cross-sectional view of an example three-part rotor with a hollow shaft and a lamination stack.

FIG. 3 shows such a lamination stack 5 slid onto a hollow shaft 1, whereby a disc spring 7 is arranged between the face of the lamination stack 5 and the second thrust washer 3. In this case, said disc spring 7 augments the compressibility required for the frictional connection in order to ensure adequate axial bracing for the lamination stack.

Figure 4:
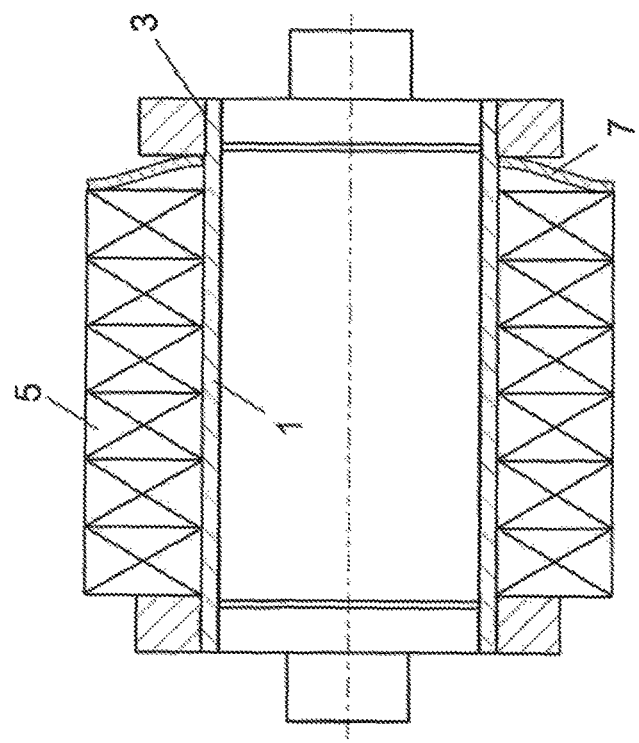
FIG. 4 is a cross-sectional view of an example fixed lamination stack with a disc spring.

FIG. 4 then shows a rotor for an electrical machine manufactured according to the methods described. Identified is the hollow shaft 1, the diameter of which comprises two axially separated sub-sections 2 and 3, each having an enlarged diameter made by roller burnishing. Pressed onto each of the sub-sections 2 and 3 in a frictional interlocking manner are thrust washers 4 and 6, which brace the fitted lamination stack with clearance in a rotation resistant manner. Prior to the thrust washers 4 and 6 being pressed, end flanges 8 are pressed into each end face of the hollow shaft 1, said end flanges 8 accepting an output shaft. The end flanges 8 support the wall of the hollow shaft 1 at the place where the thrust washers 4 and 6 are pressed.

What is claimed is:

1. A method for mounting laminated sheets onto a shaft of a rotor for an electrical machine, the method comprising:
   sliding the laminated sheets onto the shaft to lie against a first thrust washer configured as a stop, the first thrust washer being positioned along a first subsection of the shaft;
   enlarging a surface of a second subsection of the shaft by introducing an exterior surface profile; and
   pressing a second thrust washer onto the second subsection of the shaft in a frictional interlocking manner by axially bracing the laminated sheets.

2. The method of claim 1 further comprising assembling the laminated sheets into one or more punch stacked lamination stacks.

3. The method of claim 1 further comprising:
   enlarging a surface of the first subsection of the shaft by introducing an exterior surface profile; and
   pressing the first thrust washer onto the first subsection of the shaft in a frictional interlocking manner after the surface of the first subsection is enlarged.

4. The method of claim 3 wherein the exterior surface profiles of the first and second subsections of the shaft are enlarged, then the first thrust washer is pressed onto the first subsection of the shaft, then the laminated sheets are slid onto the shaft, and then the second thrust washer is pressed onto the second subsection of the shaft.

5. The method of claim 1 wherein the laminated sheets are slid onto the shaft with an elastic element, which is braced together with the laminated sheets between the first and second thrust washers.

6. The method of claim 1 wherein a lamination stack comprising the laminated sheets is slid onto the shaft with clearance and centered by structures on faces of the lamination stack, wherein mating structures on contact surfaces of the first and second thrust washers cooperate with the structures on the faces of the lamination stack.

7. A rotor for an electrical machine comprising:
   a shaft with a first subsection spaced apart in an axial direction from a second subsection, wherein the first and second subsections have enlarged diameters relative to a third subsection of the shaft, with the enlarged diameters being attributable to enlargements to a material of which the shaft is comprised;

a first thrust washer that has been pressed onto the first subsection of the shaft and is retained on the shaft in a frictional interlocking manner;

a second thrust washer that has been pressed onto the second subsection of the shaft and is retained on the shaft in a frictional interlocking manner; and laminated sheets that surround the shaft with at least some clearance and are braced in a rotation-resistant manner between the first and second thrust washers.

8. The rotor of claim 7 wherein the shaft is hollow.

9. The rotor of claim 7 wherein the laminated sheets form a lamination stack, wherein the lamination stack and the first and second thrust washers are penetrated by a coaxial bore into which a locking pin is inserted.

10. The rotor of claim 7 wherein the enlarged diameter of the first subsection of the shaft is larger than the enlarged diameter of the second subsection of the shaft, wherein an outer diameter of the second subsection of the shaft is smaller than a diameter of a central bore of the first thrust washer.

11. An electrical machine comprising a rotor that comprises:
a shaft with a first subsection spaced apart in an axial direction from a second subsection, wherein the first and second subsections have enlarged diameters relative to a third subsection of the shaft, with the enlarged diameters being attributable to enlargements to a material of which the shaft is comprised;

a first thrust washer that has been pressed onto the first subsection of the shaft and is retained on the shaft in a frictional interlocking manner;

a second thrust washer that has been pressed onto the second subsection of the shaft and is retained on the shaft in a frictional interlocking manner; and laminated sheets that surround the shaft with at least some clearance and are braced in a rotation-resistant manner between the first and second thrust washers.

12. The electrical machine of claim 11 in the form of an asynchronous motor.

13. The electrical machine of claim 11 in the form of a permanent magnet.

* * * * *